March 9, 1943.     J. R. BROOKS     2,313,462
LUBRICATOR FOR ENGINE CYLINDERS
Filed Feb. 21, 1941
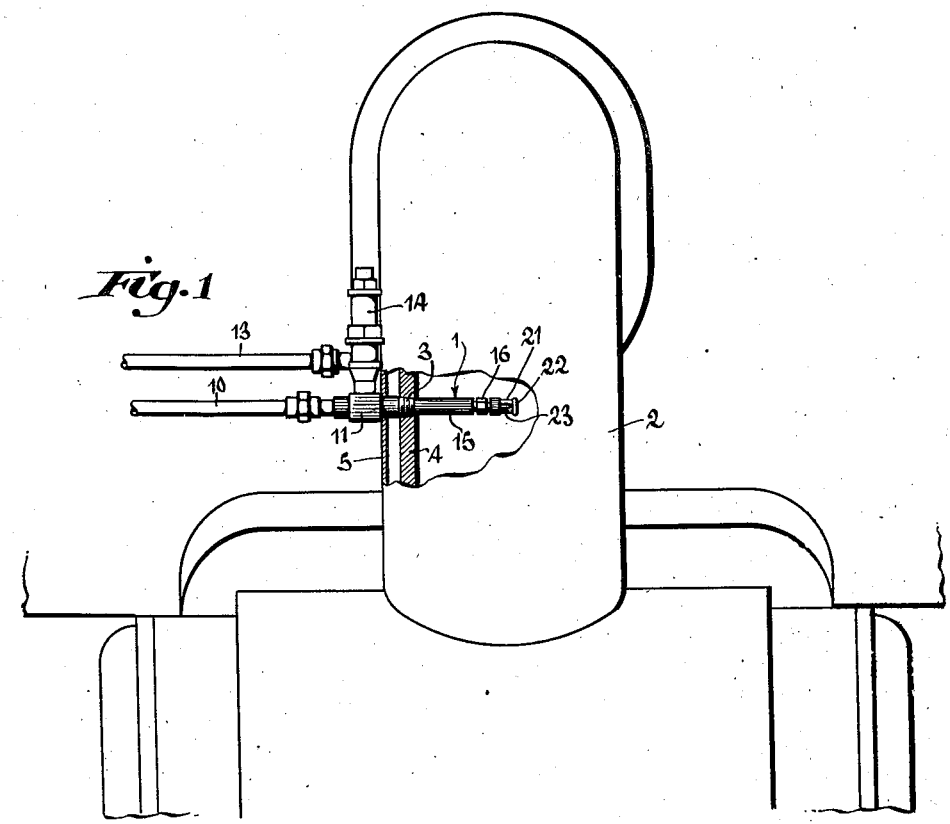
*Fig.1*
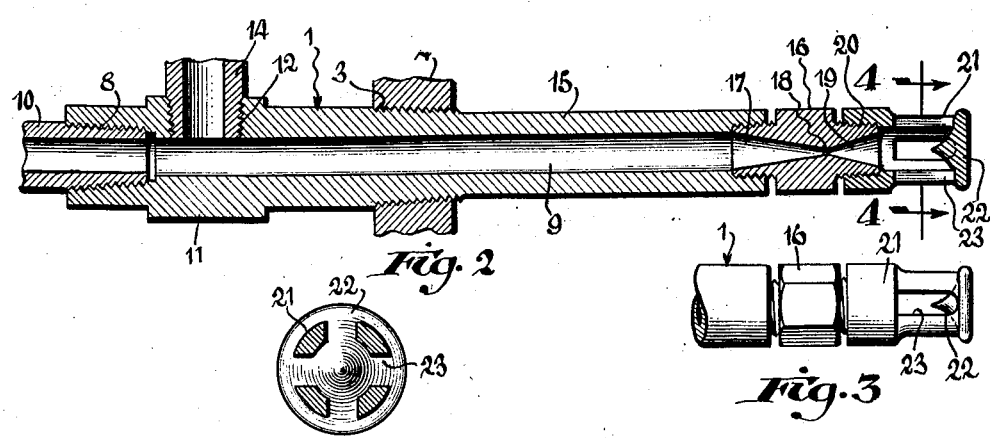
*Fig.2*
*Fig.3*
*Fig.4*
INVENTOR.
BY John R. Brooks
ATTORNEY.

Patented Mar. 9, 1943

2,313,462

UNITED STATES PATENT OFFICE 2,313,462

LUBRICATOR FOR ENGINE CYLINDERS

John R. Brooks, Richmond, Va.

Application February 21, 1941, Serial No. 380,066

1 Claim. (Cl. 184—56)

This invention relates to improvements in vaporizer nozzles for dispersingly injecting a lubricant into a steam line or chamber of a steam engine, and for use in connection with force feed lubricators of the class and type employed for locomotive lubrication.

A nozzle or spud is utilized for introducing and distributing lubricant in a steam line or chamber, the lubricant supplied to the nozzle by the force feed lubricator in metered quantities under pressure for delivery in a vaporized or finely diffused state, and thoroughly intermingled with the steam supply of the valve or cylinders of an engine to be lubricated, in a heated vaporized condition.

The vaporizer embodies an elongated tubular spud or nozzle, adapted to be extended preferably into a steam line, for example, the steam supply line of the valves and cylinders of a locomotive engine. The lubricant is introduced into the bore of the stem or nozzle, preferably at one side and at right angles to a blast of saturated steam under pressure supplied at the outer or receiving end of the bore, for discharge into the main superheated steam supply line.

The nozzle or stem is supplied with moist or saturated steam from any suitable source, in locomotive service preferably from the air pump steam supply line, which, flowing at a relatively high velocity, tends to preliminarily break the liquid lubricant into small particles. The cylinders are supplied with superheated steam through the main supply pipe, and the major portion of the nozzle extending across the supply pipe is exposed to the moving column of superheated steam and heated thereby. The nozzle thus acts as a booster, producing expansion of the saturated steam within the heated portion with increased pressure for aiding the discharge against the pressure within the supply pipe. The temperature increase likewise affects the lubricant carried by the steam, making it more readily vaporized prior to diffusion at the discharge end of the nozzle. It likewise serves as a pre-heater for the engine valve in the delivery of steam into the main steam line prior to opening the main throttle.

The apparatus is particularly adapted for lubricating the cylinder and valve chests, and other steam chambers of a locomotive in which there is present a high internal working pressure, necessitating that the lubricant be injected at a relatively greater pressure, and in which it is necessary that the lubricant be finely diffused and entrained in the steam supply for an efficient distribution thereof.

The force feed lubricator supplying oil or other lubricant to the nozzle is connected to and operated by the moving parts of the locomotive, so that lubrication control is constant and simultaneous with the control and operation of the engine. Likewise, for simplicity of operation, the nozzle steam supply may be controlled in conjunction with the locomotive throttle in order to cut off the steam supply coincidentally with closing of the throttle, or, if desired, a separate valve may be installed in the nozzle steam supply line, permitting operation of the nozzle independent of the engine throttle. The lubricant being fed under pressure from the force feed lubricator, enters the nozzle at the breech or receiving end and in its passage therethrough is heated and diffused with the steam and forcibly discharged or injected into the main steam supply line of the cylinder in a vaporized state for deposit upon the moving parts within the valve chest and cylinder.

It is an object of the invention to provide a simplified vaporizer nozzle used in connection with a force feed lubricator for entraining the lubricant in a saturated steam supply within an elongated nozzle, the nozzle being exposed to a high temperature superheated steam supply flowing through the main supply pipe resulting in a pressure and temperature increase within the nozzle for forcible discharge of mixed steam and lubricant vapor into the supply line.

It is another object of the invention to provide a lubricant injector nozzle of elongated tube form to project transversely into a steam line into which the lubricant and forcing steam are admitted relatively at an angle at one end of the tube for diffusing and heating the lubricant within the tube, and forcibly ejecting the same through a converging and diverging restricted outlet against a central conical deflector at the opposite end of the tube within the steam line.

It is another object to provide a lubricant vaporizer nozzle for installation in steam supply passages and the like, the nozzle having toward its discharge end a restricted converging diverging passageway for thoroughly diffusing the mixture of lubricant and steam, and discharging the same at high velocity upon a conical spreader or deflector facing the discharge end of the passageway for dispersing the mixture approximately for the full area of the steam supply passage.

It is a further object to provide an atomizer nozzle of simple and efficient design, having relatively large passageways to avoid clogging and excessive wear, and in which the discharge fittings, being subject to the greatest wear, may be conveniently replaced when worn.

Further objects and advantages of the invention will be more fully apparent from a description of the accompanying drawing, in which:

Figure 1 is a diagrammatic side view, showing the steam supply pipe and valve chest of a locomotive, the steam pipe being shown partially in section to illustrate the atomizer nozzle installed therein together with the necessary fittings.

Figure 2 is an enlarged longitudinal sectional view, illustrating the structure of the nozzle.

Figure 3 is a fragmentary side view showing the discharge fittings of the nozzle.

Figure 4 is a section taken on line 4—4, Figure 2, illustrating the conical spreader cap at the discharge end of the nozzle.

The vaporizer spud or nozzle comprises an elongated tube or stem, the receiving end of which is counter-bored for a steam line connection, preferably from the boiler, discharging a blast of saturated steam through the tube. Adjacent the steam supply fitting which is disposed axially of the bore, the tubular extension is provided with a lubricant supply fitting which discharges through a port communicating with the bore, preferably at right angles thereto. The lubricant is supplied in metered quantities under pressure by a force feed lubricator, picked up by the blast of saturated steam and carried through the tube, the length of which is sufficient to permit heating, diffusing, and mixing of the lubricant particles with the steam.

The tubular extension projecting approximately to the center of the cylinder steam supply pipe, crosswise thereof, is exposed to the flow of high temperature superheated steam passing therethrough, thus heating the tube and the saturated steam and lubricant flowing therein to approximately the temperature of the steam in the supply pipe. This causes expansion of the superheated steam with a consequent increase in pressure; therefore, the extension becomes a booster effecting a further heating and diffusion of the lubricant and an increase in pressure within the stem extension.

Upon approaching the discharge end of the nozzle, the lubricant carrying steam enters a Venturi type of outlet having a converging diverging passageway joined by a restricted opening or throat by which its velocity is greatly increased. A conical deflector cap is disposed centrally adjacent the diverging or discharge end of the Venturi outlet, the conical face of which is presented to the high velocity stream forcibly discharged from the nozzle, deflecting the discharge stream laterally and dispersing it in a finely diffused state. The deflector cap breaks up the heated lubricant particles into a very fine mist or vapor, thoroughly heated and intermingled with the steam in traveling through the tube, and discharging at high velocity through the Venturi discharge end of the tube.

The mixture forcibly impinging upon the conical deflector cap is efficiently and most appropriately distributed into the stream line to be conveyed with the steam into the valve and cylinder of the engine for the lubrication thereof.

Referring to Figure 1, the lubricator nozzle or spud, indicated generally at 1, is shown installed in the steam supply pipe 2 of a locomotive cylinder. The stem or shank of the nozzle toward the head or receiving end is threaded as at 3 for a tapered screw-threaded engagement with the wall 4 of the steam pipe. The steam pipe may include a jacket 5 enclosing a suitable layer of heat insulating material with which the pipe is enveloped. The shank of the nozzle extends a sufficient distance outwardly to accommodate the jacket and dispose the head or receiving end externally thereof for making the necessary steam and lubricant pipe connections.

The head or steam receiving end of the nozzle includes an internal screw-threaded counterbore 8, axial or concentric with the bore 9 of the tube for making a pipe connection with the steam supply pipe 10 which connects with the boiler or other source for a supply of steam. The steam may be supplied and controlled in any desired manner, for example, by a hand operated valve, although it is preferable to control the steam supply coincidentally with the operation of the engine throttle so as to cut off the steam simultaneously with closing of the throttle.

A lubricant supply connection is made adjacent the steam receiving end, the nozzle having a receiving portion 11 to accommodate a bore or port 12, preferably at right angles to the bore of the tube and communicating therewith for making a pipe connection with the lubricant supply line 13 through the terminal check valve 14 screw-threaded therein.

The lubricant supply pipe receives lubricant under pressure from a force feed lubricator, not shown, which may be mounted upon the locomotive at a convenient location. The lubricator may be of any conventional design, preferably of a type which is in operative connection with the moving parts of the locomotive, so that the operation is always effective when the locomotive is in motion.

The terminal check valve is interposed in the line for governing and controlling the delivery pressure of the lubricant for discharge at a pressure in excess of the internal or countersteam pressure in the nozzle. It may be of any conventional type, commonly employed in locomotive force feed lubricating systems, either a ball or a diaphragm type characteristic in that the valve normally is closed to the lubricant delivery side until the lubricant therethrough in the feed line reaches a predetermined pressure to unseat or open the valve for an expulsion or discharge of lubricant, and then closed until the lubricant pressure again arises for a subsequent valve unseating operation.

The steam supply to the nozzle is continuous, while the lubricant supply is intermittent, the frequency depending upon the action of the terminal valve which necessitates raising the pressure sufficiently to open the valve for feeding the lubricant to the nozzle. As the lubricant is forced into the bore of the nozzle, it is dispersed under the action of the blast of inflowing steam and intermixed therewith in its transit through the bore toward the discharge end of the nozzle.

The portion of the nozzle indicated at 15 disposed interiorly of the steam supply line, being exposed to the column of superheated steam flowing toward the cylinder, is heated thereby, causing heating and expansion of the saturated lubricant carrying steam flowing therein, with a consequent increase in pressure. The nozzle therefore becomes a booster, causing a forcible discharge of the products into the steam supply pipe.

A Venturi type fitting 16, provided with a converging inlet passage 17, a restricted duct or neck 18, and a diverging discharge passageway 19, is screw-threaded into the outlet end of the booster nozzle. The Venturi fitting causes a substantial increase in the discharge velocity of steam as it is forced into the steam pipe 2. In addition to increasing the velocity the passage through the Venturi fitting serves also to more thoroughly homogenize the mixture, the lubricant particles entrained in the steam supply being more thoroughly vaporized because of superheating of the saturated steam in its passage through the booster section of the nozzle.

The discharge end of the Venturi fitting includes a screw-threaded boss 20 for attachment of a deflector fitting 21, constituting a slotted sleeve with a conical deflector or spreader cap 22 fixed to the opposite end and presented to the discharge or divergent passageway of the Venturi fitting as an end wall thereof. The deflector cap may be formed integral with the sleeve fitting or may be made separately, then welded thereto. The deflecting surface of the cone 22 is preferably of slightly concave outline as viewed from the side, that is, the sides thereof are curved or dished inwardly as distinguished from the straight sides of a true cone. The cone is disposed concentric with the outlet of the discharge passageway, whereby the discharged steam and lubricant particles are deflected laterally, starting from the apex outwardly. The curved or concave surface is somewhat advantageous over the straight sides cone in that it presents less resistance to the flow, the change in direction of the stream being more gradual than that effected by a straight sided cone.

The sleeve fitting is provided with slots 23, through which the deflected stream of finely diffused lubricant and steam is discharged into the superheated steam just previous to passing through the valves and cylinders for uniform deposit upon the surfaces thereof.

The Venturi discharge tube and deflector combination creates a high velocity and thorough diffusion of the discharged stream, and may be of relatively heavy construction.

This is of advantage since this portion is exposed to and acts upon the high pressure, high temperature steam, and is subject to corrosion and wear. The relatively large openings permitted by this construction, is likewise of advantage in that the likelihood of clogging is materially decreased. The structure provides a high degree of efficiency, at the same time preserving relatively heavy construction and long wearing qualities.

The deflector sleeve and Venturi fitting are independently separable from the nozzle, permitting convenient renewal should the occasion require.

For locomotive engine service, the steam supply for the nozzle is taken from the steam line supplying the air pump, so that steam can be preliminarily supplied to the engine valve while the locomotive is stationary to heat the valve without injecting any lubricant into the steam line for the engine as the lubricant is only supplied when the locomotive is running.

Having described my invention, I claim:

A lubricant vaporizer nozzle, comprising: an elongated tubular stem, screw-threaded at one end for attachment to a steam pipe, with the stem extended interiorly of the pipe and crosswise thereof, the stem having a bore, the receiving end of which is fitted for connection with a supply of saturated steam, a lubricant inlet port communicating with the bore at one side and adjacent the steam receiving end thereof, the port fitted for a connection with a supply of lubricant delivered under pressure to the bore for entraining the lubricant in the saturated steam during its passage through the bore, the opposite end of the bore having a Venturi type discharge fitting screw-threaded thereon, the fitting having a converging diverging bore with a restricted discharge passage therebetween for discharging the steam and lubricant at high velocity, and a deflector fitting screw-threaded on the discharge end of the Venturi type tube, the deflector fitting constituting a slotted cage for lateral discharge and having a conical deflector cap disposed at one end thereof opposite the discharge opening of the Venturi fitting for diffusing the vapor and entraining the same within the steam flowing through the supply pipe.

JOHN R. BROOKS.